No. 845,968. PATENTED MAR. 5, 1907.
H. M. MURRAY.
COFFEE POT.
APPLICATION FILED NOV. 3, 1906.

H. M. Murray, Inventor,

Witnesses

UNITED STATES PATENT OFFICE.

HORACE M. MURRAY, OF SELIGMAN, MISSOURI.

COFFEE-POT.

No. 845,968.      Specification of Letters Patent.      Patented March 5, 1907.

Application filed November 3, 1906. Serial No. 341,908.

*To all whom it may concern:*

Be it known that I, HORACE M. MURRAY, a citizen of the United States, residing at Seligman, in the county of Barry and State of Missouri, have invented a new and useful Coffee-Pot, of which the following is a specification.

The invention relates to improvements in coffee-pots.

The object of the present invention is to improve the construction of coffee-pots and to provide a simple and comparatively inexpensive one having straining means for holding the coffee and adapted to condense the steam and vapor arising in the coffee-pot, whereby the full strength of the coffee and the aroma will be saved.

A further object of the invention is to provide a coffee-pot having a condensing-lid adapted to be positively held in a closed position by the hand grasping the handle of the coffee-pot while pouring out the contents thereof.

With these and other objects in view the invention consists in the construction and novel combination of parts hereinafter fully described, illustrated in the accompanying drawing, and pointed out in the claims hereto appended, it being understood that various changes in the form, proportion, size, and minor details of construction within the scope of the claims may be resorted to without departing from the spirit or sacrificing any of the advantages of the invention.

Figure 1:
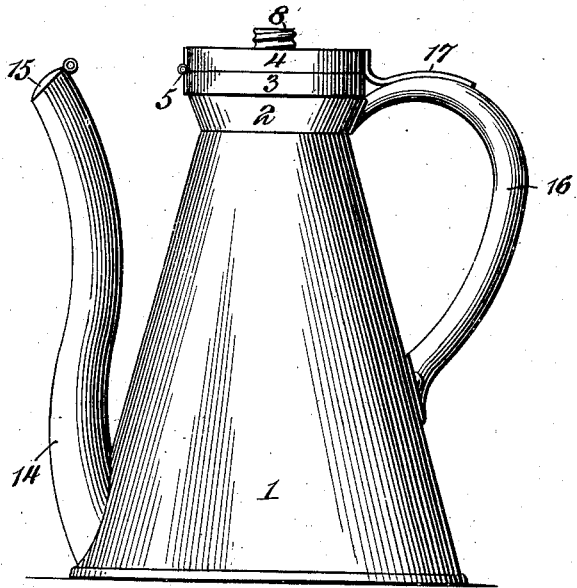
Figure 3:
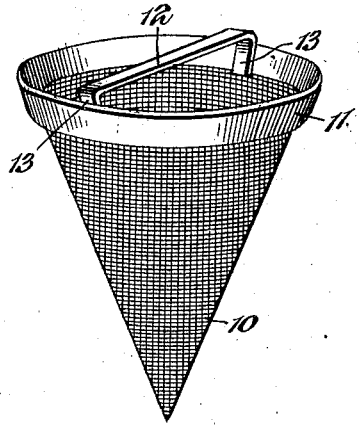
Figure 2:
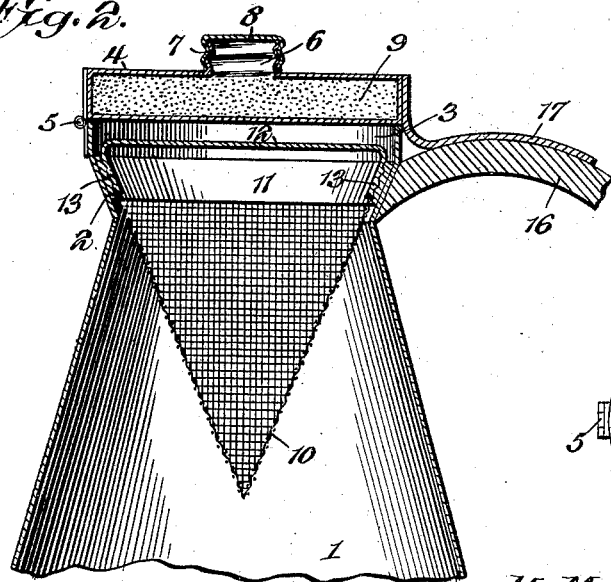
Figure 4:
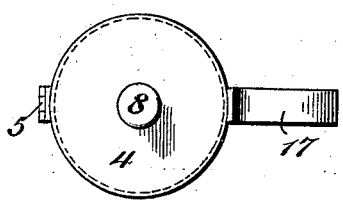

In the drawing, Figure 1 is a side elevation of a coffee-pot constructed in accordance with this invention. Fig. 2 is an enlarged vertical sectional view of the upper portion of the coffee-pot. Fig. 3 is an enlarged detail perspective view of the straining-receptacle. Fig. 4 is a plan view of the lid of the coffee-pot.

Like numerals of reference designate corresponding parts in all the figures of the drawing.

1 designates a coffee-pot designed to be constructed of any suitable material and tapered upwardly from the bottom to within a short distance of the top and provided thereat with an extension or neck consisting of an oppositely-tapered lower portion 2 and a cylindrical upper portion 3. The lower tapered portion 2 of the neck, which forms a seat, is flared and inclines upwardly and outwardly, while the walls or sides of the upper portion 3 are vertical. The upper portion 3 receives a hollow condensing-lid 4, which is connected with the upper vertical portion 3 of the neck by a hinge 5, which is located at the front of the coffee-pot.

The hollow lid, which is preferably constructed of aluminium, may be made of any other suitable material, and it is provided at the top with a flanged opening 6, the upwardly-extending flange 7 thereof being threaded and receiving a screw-cap 8. A filling 9, of salt or other suitable material, is placed within the hollow lid, which is adapted to condense steam and vapor arising within the coffee-pot, whereby the strength and aroma of the coffee are saved and the quality of the coffee greatly increased.

Within the coffee-pot is arranged a straining-receptacle 10, consisting of an inverted conical body portion and a supporting ring or band 11, constructed of stout sheet metal and having inclined sides, which fit against the inner face of the inclined lower portion 2 of the neck of the coffee-pot. The body portion 10, which forms a strainer and which is adapted to receive the coffee, may be constructed of fine woven wire or finely-perforated sheet metal or other suitable material, and the inclined sides of the straining-receptacle extend downwardly and inwardly at an angle to the inclined sides of the body of the coffee-pot. The coffee which is placed within the straining-receptacle is thoroughly subjected to the action of the boiling water when making coffee and is confined in the upper portion of the coffee-pot, so that there is no liability of any of the coffee-grounds leaving the coffee-pot when pouring out the contents of the latter. The stout metallic band or ring relieves the body portion of the strainer of strain, and it is provided with a handle consisting of a cross bar or piece 12, extending across the straining-receptacle and having its terminals 13 suitably secured to the inner face of the ring or band at opposite sides thereof.

The coffee-pot is provided at the front with a spout 14, connected with the body of the coffee-pot at the bottom thereof, so that the steam and aroma will not escape through the spout during the operation of making coffee. The spout is also provided at its upper end with a hinged lid 15, for preventing the escape of vapor and aroma and to keep out dust and insects.

The coffee-pot is provided at the back with a handle 16 of the usual configuration and suitably secured at its ends to the coffee-pot. The lid or cover of the coffee-pot rests upon the upper edge of the vertical portion 3 of the neck, and it is provided at the back of the coffee-pot with an arm 17, arranged upon and extending along the top portion of the handle 16, and adapted to be grasped simultaneously with the said handle, whereby the lid will be held positively closed while pouring coffee from the pot, so that there will be no liability of the hot liquid escaping from the coffee-pot. The arm 17, which is suitably secured at its inner end to the back of the lid, is curved to conform to the configuration of the handle 16 and is engaged by the thumb of the hand which grasps the handle.

Having thus fully described my invention, what I claim as new, and desire to secure by Letters Patent, is—

1. The combination of a coffee-pot provided with a neck consisting of upper and lower portions, the lower portion having inclined sides and forming a seat and the upper portion provided with vertical sides, a straining-receptacle having an inclined portion to fit the seat, and a lid supported by the vertical portion of the neck.

2. The combination of a coffee-pot provided with a neck consisting of a tapered lower portion and a cylindrical upper portion, a straining-receptacle provided with a tapered ring or band arranged on the tapered portion of the neck, and a hollow cylindrical lid supported by the cylindrical portion of the neck.

3. The combination of a coffee-pot having a handle at the back, a lid hinged at the front to the coffee-pot, and an arm extending from the back of the lid and lying upon the top of the handle when the lid is closed.

4. The combination of a coffee-pot provided with a neck consisting of a lower portion having inclined sides forming a seat, and an upper portion provided with vertical sides, a conical straining-receptacle fitting the inclined sides of the lower portion of the neck and supported by the said seat, a transverse handle extending across the top of the straining-receptacle and having its terminals connected to the sides of the same, and a lid located above the said handle and supported by the vertical sides of the upper portion of the neck.

In testimony that I claim the foregoing as my own I have hereto affixed my signature in the presence of two witnesses.

HORACE M. MURRAY.

Witnesses:
C. W. RUBEN,
G. W. POWERS.